US006343539B1

(12) United States Patent
Du

(10) Patent No.: US 6,343,539 B1
(45) Date of Patent: Feb. 5, 2002

(54) MULTIPLE LAYER PUMP DIAPHRAGM

(76) Inventor: Benjamin R. Du, 22832 Skyview Ave., Laguna Beach, CA (US) 92677

( * ) Notice: Subject to any disclaimer, the term of this patent is extended or adjusted under 35 U.S.C. 154(b) by 0 days.

(21) Appl. No.: 09/437,977

(22) Filed: Nov. 10, 1999

(51) Int. Cl.[7] .................................................. F16J 3/00

(52) U.S. Cl. .................................... 92/100; 92/103 SD

(58) Field of Search ................................ 92/98 R, 100, 92/103 SD, 103 R

(56) References Cited

U.S. PATENT DOCUMENTS

| | | | |
|---|---|---|---|
| 740,892 | A | 10/1903 | Meyer |
| 1,881,344 | A | 10/1932 | Apple |
| 1,967,746 | A | 7/1934 | Dulaney |
| 2,332,664 | A | 10/1943 | Orshansky |
| 2,452,933 | A | 11/1948 | Joppich |
| 2,485,408 | A | 10/1949 | Pezzillo |
| 2,535,695 | A | 12/1950 | Pezzillo |
| 2,543,696 | A | 2/1951 | Brown |
| 2,671,462 | A | 3/1954 | Grier |
| 2,722,919 | A | 11/1955 | Kuhn |
| 2,761,078 | A | 8/1956 | McAdam |
| 2,798,440 | A | 7/1957 | Hall |
| 2,873,684 | A | 2/1959 | Kaeding |
| 2,920,575 | A | 1/1960 | White |
| 2,937,792 | A | 5/1960 | Firstenberg |
| 2,981,182 | A | 4/1961 | Dietrich |
| 2,993,449 | A | 7/1961 | Harland |
| 3,166,991 | A | 1/1965 | Blenkle |
| 3,166,993 | A | 1/1965 | Blenkle |
| 3,167,083 | A | 1/1965 | Nickell |
| 3,168,967 | A | 2/1965 | Giampa |
| 3,207,070 | A | 9/1965 | Kingler |
| 3,699,846 | A | 10/1972 | Stomper |
| 3,719,436 | A | 3/1973 | McFarlin |
| 3,741,689 | A | 6/1973 | Rupp |
| 3,749,527 | A | 7/1973 | Slagle |
| 3,753,629 | A | 8/1973 | Jackson |
| 3,782,863 | A | 1/1974 | Rupp |
| 3,808,814 | A | 5/1974 | Macy, II |
| 3,813,191 | A | 5/1974 | Foster |
| 3,830,405 | A | 8/1974 | Jaeger |
| 4,008,984 | A | 2/1977 | Scholle |
| 4,111,614 | A | 9/1978 | Martin |
| 4,124,147 | A | 11/1978 | Priese |
| 4,127,365 | A | 11/1978 | Martin |
| 4,163,164 | A | 7/1979 | Pieters |
| 4,165,206 | A | 8/1979 | Martin |
| 4,172,698 | A | 10/1979 | Hiaz |
| 4,436,493 | A | 3/1984 | Credle |
| 4,540,349 | A | 9/1985 | Du |
| 4,551,076 | A | 11/1985 | DuBois |
| 4,681,518 | A | 7/1987 | Credle |
| 4,736,873 | A | 4/1988 | Patriquin |

(List continued on next page.)

FOREIGN PATENT DOCUMENTS

| | | |
|---|---|---|
| CH | 144945 | 4/1931 |
| DE | 1138637 | 10/1962 |
| FR | 785597 | 10/1933 |

OTHER PUBLICATIONS

Aro, "Air Operated Diaphragm Pumps"; One Page.
Liqui–Box Corporation; "Liqui–Box Press"; Four pages.

*Primary Examiner*—Edward K. Look
*Assistant Examiner*—Thomas E. Lazo
(74) *Attorney, Agent, or Firm*—Stetina Brunda Garred & Brucker

(57) ABSTRACT

A pump diaphragm comprising a first layer formed from a first material such as synthetic rubber which is adapted to be substantially impervious to both hydrophobic and hydrophilic liquids. In addition to the first layer, the pump diaphragm includes a second layer which is disposed in laminar juxtaposition to the first layer. The second layer is itself formed from a second material such as a thermoplastic elastomer which is adapted to possess a high level of flexibility and resiliency.

20 Claims, 3 Drawing Sheets

U.S. PATENT DOCUMENTS

| | | | | | |
|---|---|---|---|---|---|
| 4,753,370 | A | | 6/1988 | Rudick | |
| 4,793,524 | A | | 12/1988 | Starr | |
| 4,815,634 | A | | 3/1989 | Nowicki | |
| 4,828,465 | A | | 5/1989 | Credle | |
| 4,923,168 | A | | 5/1990 | Murata | |
| 4,930,555 | A | | 6/1990 | Rudick | |
| 5,002,469 | A | | 3/1991 | Murata | |
| 5,056,686 | A | | 10/1991 | Jarrett | |
| 5,083,906 | A | | 1/1992 | Du | |
| 5,158,210 | A | | 10/1992 | Du | |
| 5,170,912 | A | | 12/1992 | Du | |
| 5,230,443 | A | | 7/1993 | Du | |
| 5,361,943 | A | | 11/1994 | Du | |
| 5,470,209 | A | | 11/1995 | Hartley | |
| 5,664,940 | A | | 9/1997 | Du | 417/393 |
| 5,950,523 | A | * | 9/1999 | Reynolds | 92/98 R |
| 6,145,430 | A | * | 11/2000 | Able et al. | 92/93 |

* cited by examiner

MULTIPLE LAYER PUMP DIAPHRAGM

CROSS-REFERENCE TO RELATED APPLICATIONS (Not Applicable)

STATEMENT RE: FEDERALLY SPONSORED RESEARCH/DEVELOPMENT (Not Applicable)

BACKGROUND OF THE INVENTION

The present invention relates generally to pumps, and more particularly to a multiple layer diaphragm which is particularly suited for use in a pump and is adapted to possess a high level of flexibility and resiliency while being capable of withstanding an aggressive chemical environment.

Pumps, and more particularly gas driven pumps, for pumping fluids such as hydrophobic (e.g., oil based) liquids and/or hydrophilic liquids are well known in the prior art. Such gas driven pumps typically comprise a housing which defines an interior cylinder or pumping chamber. Disposed within the pumping chamber is a reciprocally moveable piston having a diaphragm attached thereto. In addition to being attached to the piston, the diaphragm is attached to the housing of the pump so as to extend between the piston and the housing. As such, the piston and the diaphragm collectively divide or segregate the pumping chamber into a pumped product portion and a pressurizable portion. In the operation of the pump, the liquid is alternately drawn into and forced from within the pumped product portion, with a gas such as carbon dioxide alternately being forced into and vented from the pressurizable portion for purposes of facilitating the reciprocal movement of the piston within the pumping chamber.

As will be recognized, in those instances when the hydrophobic, hydrophilic or other liquids with which the pump is being used are “aggressive chemicals”, the diaphragm must be fabricated from a material which is capable of withstanding the derogatory effects of such liquids. However, in addition to being able to withstand the aggressive chemical environment, the material used to form the diaphragm must also have enough flexibility and resiliency as is needed to properly move (i.e., stretch) during the reciprocal movement of the piston.

To provide the required attributes of durability and flexibility, the current practice in the prior art is to outfit pumps used in conjunction with aggressive chemicals with diaphragms comprising a layer of fabric impregnated with a synthetic rubber such as VITON® which is manufactured by Dupont Dow Elastomers, L.L.C. of Wilmington, Del. Though this particular synthetic rubber is formulated to withstand chemically aggressive liquids, it only possesses a relatively low level of flexibility and resiliency. As a result, the repeated stretching of the diaphragm as occurs during the normal operation of the pump tends to rapidly weaken the same, as could result in the cracking or rupture thereof. As will be recognized, such rupture would allow the undesired migration of the liquid within the pump from the pumped product portion of the pumping chamber to the pressurizable portion thereof. In an effort to strengthen the prior art diaphragm, the synthetic rubber used to fabricate the same is provided with the fabric core as indicated above.

The prior art diaphragms are typically fabricated via a molding process wherein the layer of fabric is impregnated with the VITON® or other synthetic rubber material. The diaphragm is formed such that the layer of fabric is captured between two layers of the VITON®. Upon the completion of the molding process, the VITON® may be vulcanized to further strengthen the same. As indicated above, though the VITON® is capable of withstanding an aggressive chemical environment, it possesses inferior flexibility characteristics as are optimal for use in a reciprocating pump. Thus, the fabric reinforcement is adapted to strengthen the VITON® for purposes of increasing its repetitive flexibility or flexing. As will be recognized, the prior art process used to mold the VITON®/fabric core diaphragm is time consuming and costly. Additionally, the resulting diaphragm includes a large amount of VITON® which, due to its cost, makes the cost of the completed diaphragm high due to not only to the cost of the VITON®, but the cost associated with the molding process as well.

Also known in the prior art are various materials such as thermoplastic elastomers which, though possessing a high level of flexibility and resiliency, are not particularly well suited to withstanding an aggressive chemical environment. Though such materials are well suited for diaphragms employed in pumps used in conjunction with non-aggressive chemicals or liquids they are typically considered to be unusable in aggressive chemical environments.

By the present invention, the Applicant has developed a pump diaphragm which combines the best attributes of synthetic rubbers such as VITON® and highly flexible thermoplastic elastomers. More particularly, the present invention relates to a diaphragm which comprises a first layer of a synthetic rubber such as VITON®, and a second layer fabricated from a highly flexible or resilient thermoplastic elastomer which is disposed in laminar juxtaposition to the first layer. The diaphragm of the present invention may be installed in a pump such that the VITON® or similar synthetic rubber layer is exposed to the pumped product portion of the pumping chamber, with only the thermoplastic elastomer layer being exposed to the pressurizable portion thereof. Thus, the VITON® layer provides the requisite capability of withstanding exposure to the aggressive chemical environment, while the thermoplastic elastomer layer provides superior flexibility and resiliency. These two layers are not adhered to each other, thus allowing at least portions thereof to move relative to each other during the reciprocation of the piston. As will be recognized, the methodology employed to fabricate the diaphragm of the present invention is significantly less costly than the prior art due to the absence of a complicated molding process wherein a fabric core is impregnated with a synthetic rubber material. Thus, the present invention provides a less costly and more effective pump diaphragm useable in an aggressive chemical environment, as compared to those diaphragms currently known and used in the prior art. These and other advantages attendant to the present invention will be discussed in more detail below.

BRIEF SUMMARY OF THE INVENTION

In accordance with the present invention, there is provided a pump diaphragm which is particularly suited for use in a pump having at least first and second housing sections, an interior pumping chamber, and a piston disposed within the pumping chamber. The diaphragm comprises a first layer which is formed from a first material adapted to be substantially impervious to liquids. More particularly, the first layer is preferably fabricated from a synthetic rubber which is adapted to be substantially impervious to both hydrophobic and hydrophilic liquids. One preferred synthetic rubber material from which the first layer may be formed is VITON® manufactured by Dupont Dow Elastomers, L.L.C. of Wilmington, Del.

In addition to the first layer, the diaphragm of the present invention comprises a second layer which is disposed in laminar juxtaposition to the first layer and formed from a second material adapted to possess a high level of flexibility and resiliency. The second material is preferably a thermoplastic elastomer. Exemplary thermoplastic elastomers which may be used to form the second layer include SANTOPRENE® manufactured by Advanced Elastomer Systems, L.P. of Akron, Ohio and GEOPLAS® manufactured by Geoplas, Inc. of Granville, Ohio.

In the preferred embodiment, the first layer has a generally annular configuration and includes inner and outer peripheral portions which define inner and outer peripheral edges, respectively. Similarly, the second layer has a generally annular configuration and includes inner and outer peripheral portions which define inner and outer peripheral edges, respectively.

Importantly, the outer peripheral portions of the first and second layers are formed to have complimentary configurations such that the outer peripheral portion of the second layer may be nested within the outer peripheral portion of the first layer. Similarly, the inner peripheral portions of the first and second layers are formed to have complimentary configurations such that the inner peripheral portion of the second layer may be nested within the inner peripheral portion of the first layer. As such, in the fabrication of the present diaphragm, the first and second layers are disposed in laminar juxtaposition to each other such that the outer peripheral portion of the second layer is nested within the outer peripheral portion of the first layer, with the inner peripheral portion of the second layer being nested within the inner peripheral portion of the first layer.

Though being disposed in laminar juxtaposition to each other, the first and second layers of the present diaphragm are preferably not affixed or adhered to each other, thus allowing for at least portions of the first and second layers to be moveable relative to each other. More particularly, such portions of the first and second layers are moveable relative to each other when the outer peripheral edges thereof are captured between the first and second housing sections of the pump, and the inner peripheral edges thereof are captured within the piston of the pump. As will be recognized, when the inner and outer peripheral edges of the diaphragm are captured within the piston and between the first and second housing sections, respectively, the piston and the diaphragm collectively divide or segregate the interior pumping chamber of the pump into pumped product and pressurizable portions, with the diaphragm being oriented such that the first layer is exposed to the pumped product portion and the second layer is exposed to the pressurizable portion.

In addition to the foregoing, the outer peripheral portions of the first and second layers are preferably sized relative to the first and second housing sections so as to be compressed thereby when captured therebetween. Similarly, the inner peripheral portions of the first and second layers are preferably sized relative to the piston so as to be compressed thereby when captured therein. Such compression of the inner and outer peripheral portions of the first and second layers prevent any migration of liquids from the pumped product portion of the pumping chamber to the pressurizable portion thereof.

Further in accordance with the present invention, there is provided a method of fabricating a pump diaphragm comprising the initial steps of forming the first and second layers from the above-described materials and with the above-described structural attributes. Subsequent to the formation of the first and second layers, the second layer is disposed into laminar juxtaposition with the first layer such that the outer peripheral portion of the second layer is nested within the outer peripheral portion of the first layer, and the inner peripheral portion of the second layer is nested within the inner peripheral portion of the first layer.

BRIEF DESCRIPTION OF THE DRAWINGS

These, as well as other features of the present invention, will become more apparent upon reference to the drawings wherein.

DETAILED DESCRIPTION OF THE INVENTION

Figure 1:
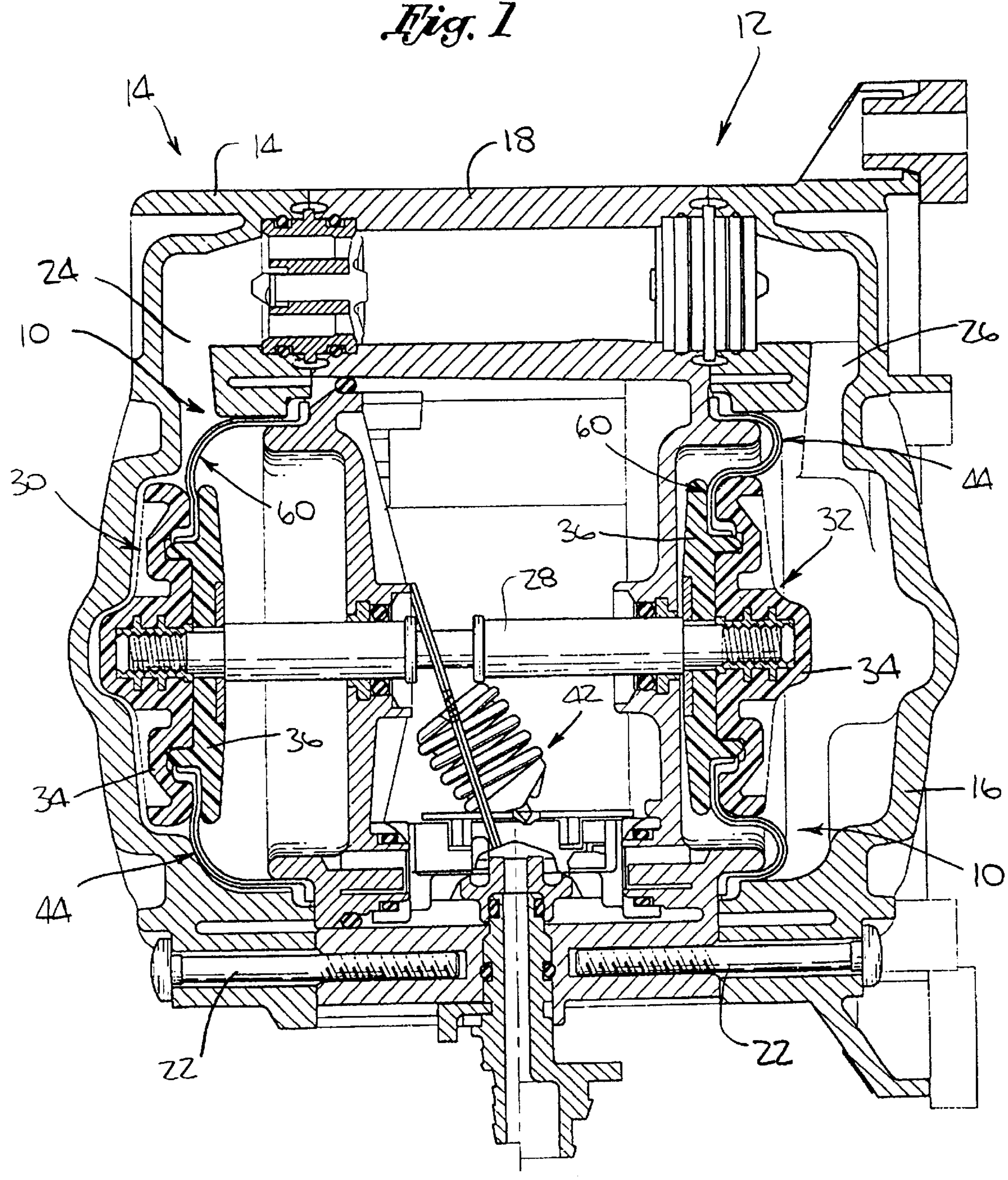
FIG. 1 is a cross-sectional view of an exemplary pump in which the diaphragm of the present invention may be employed, illustrating the operative positioning of the present diaphragm within the pump.

Referring now to the drawings wherein the showings are for purposes of illustrating a preferred embodiment of the present invention only, and not for purposes of limiting the same, FIG. 1 illustrates in cross-section the multiple layer pump diaphragm 10 of the present invention as integrated into an exemplary pump 12. The structural and functional attributes of the pump 12 are more fully described in Applicant's U.S. Pat. No. 5,664,940 entitled GAS DRIVEN PUMP issued Sep. 9, 1997 and U.S. Pat. No. 5,833,439 entitled SLIDE VALVE OF A GAS DRIVEN PUMP issued Nov. 10, 1998, the disclosures of which are incorporated herein by reference.

Basically, the pump 12 as shown in FIG. 1 comprises a housing 14 which includes a first housing section 16, a second housing section 18, and a third housing section 20 which is disposed between the first and second housing sections 16, 18. The first and second housing sections 16, 18 are each attached to respective ones of the opposed ends of the third housing section 20 via fasteners 22 such as screws. The first housing section 16 defines a first interior pumping cavity or chamber 24, with the second housing section 18 defining a second interior pumping cavity or chamber 26. Disposed within the interior of the third housing section 20 is an elongate piston shaft 28, the externally threaded opposed ends of which protrude into respective ones of the first and second pumping chamber 24, 26. Threadably connected to that end of the piston shaft 28 disposed within the first pumping chamber 24 is a first piston 30. Similarly, threadably connected to the end of the piston shaft 28 disposed within the second pumping chamber 26 is a second piston 32.

Figure 2:
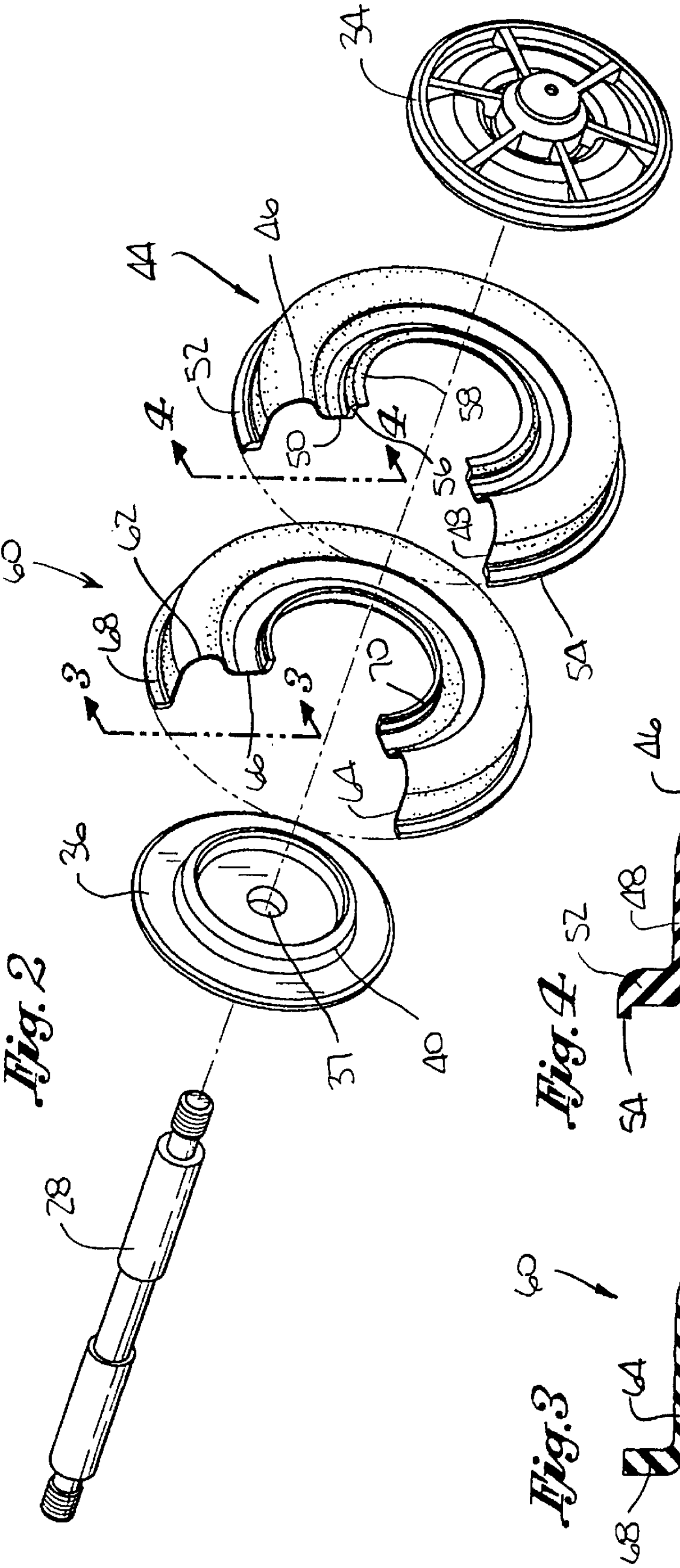
FIG. 2 is an exploded view of the diaphragm of the present invention, further illustrating various components of the pump shown in FIG. 1 to which the present diaphragm is attached.
Figure 5:
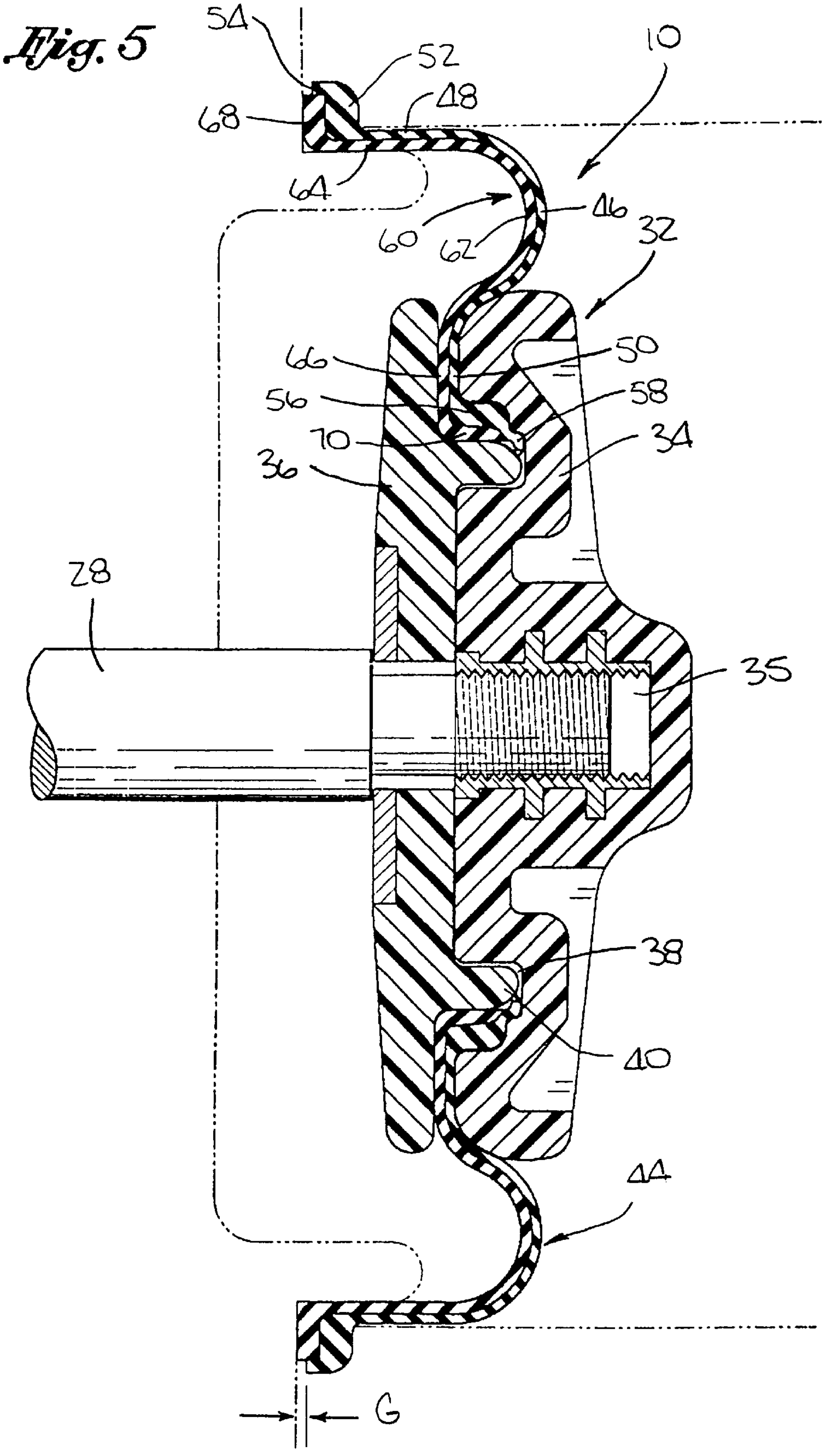
FIG. 5 is a cross-sectional view of the present diaphragm and the piston of the pump shown in FIG. 1, illustrating the manner in which the present diaphragm is captured within the piston and the housing of the pump.

As seen in FIGS. 1, 2 and 5, the first and second pistons 30, 32 are identically configured, and each include a circularly configured outer member 34 and a circularly configured inner member 36 which are disposed in abutting contact with each other. Formed within the outer member 34 is an annular groove or channel 38, which protruding from the inner member 36 is an annular flange portion 40 which is received into the channel 38 when the outer and inner members 34, 36 are properly abutted against each other.

Disposed within the approximate center of the outer member 34 is an internally threaded bore 35, while disposed in the approximate center of the inner member 36 is a circularly configured aperture 37. The attachment of the first and second pistons 30, 32 to respective ends of the piston shaft 28 is accomplished by advancing each end through the aperture 37 of a respective inner member 36, and into the bore 35 of a respective outer member 34. The threadable engagement of the outer members 34 of the first and second pistons 30, 32 to respective ends of the piston shaft 28 results in the inner member 36 being compressed between the outer member 34 and respective ones of a pair of shoulders defined by the piston shaft 28.

As will be recognized, the piston shaft 28 interconnects the first and second pistons 30, 32 such that they move concurrently along a common axis within the housing 14, with the first and second pistons 30, 32 being reciprocally moveable within the first and second pumping chambers 24, 26, respectively. Cooperatively engaged to the piston shaft 28 is an over-center linkage mechanism 42, the structural and functional attributes of which are described in Applicant's issued U.S. Patents referenced above.

The exemplary pump 12 shown in FIG. 1 includes a pair of the diaphragms 10 of the present invention. In the following description, the structural and functional attributes of the diaphragm 10 disposed within the second pumping chamber 26 will be discussed, though it will be recognized that the structural and functional attributes of the diaphragm 10 disposed within the first pumping chamber 24 are identical.

Figure 4:
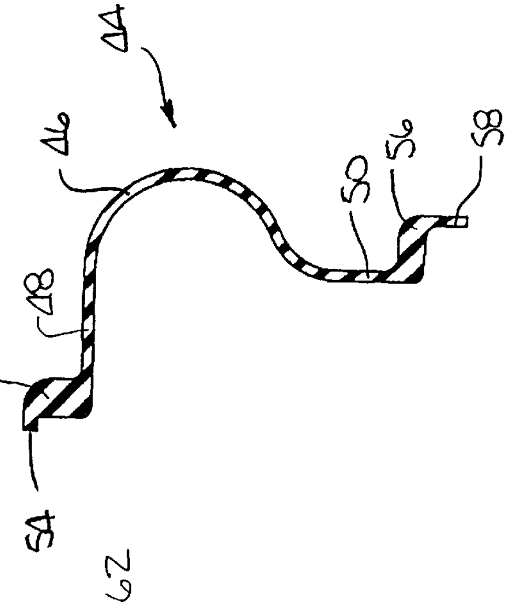
FIG. 4 is a cross-sectional view taken along line 4—4 of FIG. 2.
Figure 3:
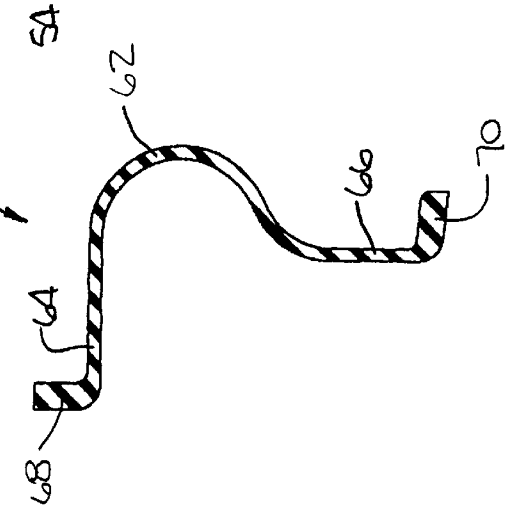
FIG. 3 is a cross-sectional view taken along line 3—3 of FIG. 2.

Referring now to FIGS. 1–5, the diaphragm 10 comprises a generally annular first layer 44 which is formed from a first material adapted to be substantially impervious to liquids. More particularly, the first layer 44 is preferably fabricated from a synthetic rubber which is adapted to be substantially impervious to both hydrophobic and hydrophilic liquids. As indicated above, one synthetic rubber material from which the first layer 44 may be formed is VITON® manufactured by Dupont Dow Elastomers, L.L.C. of Wilmington, Del. As best seen in FIG. 4, the first layer 44 includes an arcuate section 46 which transitions into a generally planar outer section 48 and a generally planar inner section 50. Extending laterally or radially outward from the distal end of the outer section 48 is an integral outer flange section 52. Extending laterally from the distal end of the outer flange section 52 away from the arcuate section 46 is a continuous, annular outer lip 54. Additionally, extending laterally from the distal end of the inner section 50 is an integral inner flange section 56. Extending laterally or radially inward from the distal end of the inner flange section 56 is an inner lip 58. The outer flange section 52 and outer lip 54 collectively define an outer peripheral portion of the first layer 44, with the outer lip 54 defining the outer peripheral edge thereof. Similarly, the inner flange section 56 and inner lip 58 collectively define an inner peripheral portion of the first layer 44, with the inner lip 58 defining an inner peripheral edge thereof.

In addition to the first layer 44, the diaphragm 10 of the present invention comprises a generally annular second layer 60 which is disposed in laminar juxtaposition to the first layer 44 and formed from a second material adapted to possess a high level of flexibility and resiliency. The second material is preferably a thermoplastic elastomer. As also indicated above, exemplary thermoplastic elastomers which may be used to form the second layer 60 include SANTOPRENE® manufactured by Advanced Elastomer Systems, L.P. of Akron, Ohio and GEOPLAS® manufactured by Geoplas, Inc. of Granville, Ohio. Similar to the first layer 44, the second layer 60 includes an arcuate section 62, the radius of which is less than that of the arcuate section 46 of the first layer 44. The arcuate section 62 of the second layer 60 itself transitions into a generally planar outer section 64 and a generally planar inner section 66. Extending laterally or radially outward from the distal end of the outer section 64 is an integral outer flange section 68. Additionally, extending laterally from the inner section 66 is an integral inner flange section 70. The outer flange section 68 of the second layer 60 defines the outer peripheral portion and outer peripheral edge thereof, with the inner flange section 70 defining the inner peripheral portion and inner peripheral edge of the second layer 60.

As best seen in FIG. 5, in the diaphragm 10, the outer peripheral portions of the first and second layers 44, 60 are formed to have complimentary configurations such that the outer peripheral portion of the second layer 60 may be nested within the outer peripheral portion of the first layer 44. Similarly, the inner peripheral portions of the first and second layers 44, 60 are formed to have complimentary configurations such that the inner peripheral portion of the second layer 60 may be nested within the inner peripheral portion of the first layer 44. More particularly, the first and second layers 44, 66 are sized and configured such that when disposed in laminar juxtaposition to each other, the outer surface of the outer flange section 68 is abutted against and extends along the inner surface of the outer flange section 52, with the outer surface of the outer section 64 being abutted against and extending along the inner surface of the outer section 48 and the outer surface of the arcuate section 62 being abutted against and extending along the inner surface of the arcuate section 46. Additionally, the outer surface of the inner section 66 is abutted against and extends along the inner surface of the inner section 50, with the inner surface of the inner flange section 70 being abutted against and extending along the outer surface of the inner flange section 56. When the second layer 60 is nested within the first layer 44 in this manner, the outer lip 54 of the first layer 44 extends along approximately half the width of the outer peripheral edge of the second layer 60 defined by the outer flange section 68 thereof. Additionally, the inner lip 58 of the first layer 44 extends completely over the inner peripheral edge of the second layer 60 defined by the inner flange section 70 thereof. Importantly, though being disposed in laminar juxtaposition to each other, the first and second layers 44, 60 of the diaphragm 10 are preferably not affixed or adhered to each other in any manner, thus allowing for at least portions of the first and second layers 44, 60 to be movable relative to each other.

Each of the diaphragms 10 as described above is configured to be integrated into the pump 12 such that the outer peripheral edges defined by the first and second layers 44, 60 thereof are captured and compressed between the third housing section 20 and respective ones of the first and second housing sections 16, 18, with the inner peripheral edges defined by the first and second layers 44, 60 thereof being captured and compressed within respective ones of the first and second pistons 30, 32. More particularly, as best seen in FIG. 5, subsequent to the fabrication of the diaphragm 10 (i.e., the placement of the first and second layers 44, 60 into laminar juxtaposition with each other), the inner peripheral portions of the first and second layers 44, 60 are captured between the outer and inner members 34, 36 of the second piston 32. When the outer and inner members 34, 36 of the second piston 32 are attached to one end of the piston shaft 28 in the above-described manner, the outer flange section 52 and outer lip 54 of the first layer 44 and outer flange section 68 of the second layer 60 are compressed against each other between one wall of the channel 38 of the outer member 34 and the flange portion 40 of the inner member 36, thus forming a radial seal. Additionally, the inner sections 50, 66 of the first and second layers 44, 60 are compressed against each other between portions of the outer and inner members 34, 36. As will be recognized, such compression facilitates the formation of a fluid-tight seal between the diaphragm 10 and the second piston 32.

In addition to the inner peripheral portions of the first and second layers 44, 60 being captured and compressed within the second piston 32, the outer flange section 52 of the first layer 44 and the outer flange section 68 of the second layer 60 are compressed against each other between the third housing section 20 and the second housing section 18. As further seen in FIG. 5, when the outer flange sections 52, 68 are captured and compressed between the second and third housing sections 18, 20, a slight gap G is defined between the outer lip 54 of the first layer 44 and the third housing section 20. Importantly, this gap G insures that the outer flange sections 52, 68 will be properly compressed against each other and between the second and third housing sections 18, 20 as is needed to form a fluid-tight seal of high integrity.

When the diaphragm 10 is attached to and extended between the second piston 32 and housing 14 in the above-described manner, the diaphragm 10 and second piston 32 collectively divide or segregate the second pumping chamber 26 into an outer pumped product portion and an inner pressurizable portion. Due to the preferred orientation of the diaphragm 10 within the second pumping chamber 26, the first layer 44 is exposed to the pumped product portion of the second pumping chamber 26, with the second layer 60 being exposed to the pressurizable portion thereof. The fluid-tight seal achieved by the capture and compression of the diaphragm 10 between the outer and inner members 34, 36 of the second piston 32 and the second and third housing sections 18, 20 of the housing 14 prevents any migration of fluid or liquids between the pumped product and pressurizable portions of the second pumping chamber 26. As the second piston 32 is reciprocally moved within the second pumping chamber 26, only the first layer 44 comes into contact with the liquids drawn into and forced from within the pumped product portion of the second pumping chamber 26. The second layer 60 is exposed to only the gas or other fluid which is forced into and vented from within the pressurizable portion of the second pumping chamber 26 for purposes of facilitating the reciprocation of the second piston 32. Thus, the second layer 60 is not exposed to any hydrophobic or hydrophilic liquids, such as aggressive chemicals, which may be within the pumped product portion of the second pumping chamber 26.

Thus, the diaphragm 10 of the present invention is installed into the pump 12 such that the first layer 44 preferably formed from the VITON® or similar synthetic rubber material is exposed to the pumped product portion of the second pumping chamber 26, with only the second layer 60 preferably formed from the thermoplastic elastomer material being exposed to the pressurizable portion of the second pumping chamber 26. The first layer 44 provides the requisite capability of withstanding exposure to the aggressive chemical environment, while the second layer 60, in addition to supporting and strengthening the first layer 44, provides superior flexibility and resiliency. As indicated above, the first and second layers 44, 60 are not adhered to each other, thus allowing at least portions thereof (i.e., the arcuate sections 46, 62 and outer sections 48, 64) to move relative to each other during the reciprocation of the second piston 32. The methodology employed to fabricate the diaphragm 10 is significantly less costly than the prior art due to the absence of a complicated molding process wherein a fabric core is impregnated with a synthetic rubber material. Thus, the diaphragm 10 provides a less costly and more effective pump diaphragm usable in an aggressive chemical environments, as compared to those diaphragms currently known and used in the prior art.

It will be recognized that the remaining diaphragm 10 in the pump 12 is captured and compressed within the first piston 30 and between the first and third housing sections 16, 20 in an orientation and manner consistent with that previously described in relation to the diaphragm 10, second piston 32, and second and third housing sections 18, 20. Additionally, those of ordinary skill in the art will recognize that the diaphragm 10, and in particular the first and second layers 44, 60 thereof, are specifically configured for use in relation to the exemplary pump 12 shown in FIG. 1. In this respect, it is contemplated that the first and second layers 44, 60 of the diaphragm 10 may be formed to have alternative configurations, depending on the structural attributes of the particular pump in which the diaphragm 10 is to be employed. Thus, the novelty of the present invention lies primarily in the use of two (2) dissimilar materials, each possessing unique attributes, for the first and second layers 44, 60 which are disposed in laminar juxtaposition to each other and capable of moving relative to each other.

Additional modifications and improvements of the present invention may also be apparent to those of ordinary skill in the art. Thus, the particular combination of parts and steps described and illustrated herein is intended to represent only one embodiment of the present invention, and is not intended to serve as limitations of alternative devices within the spirit and scope of the invention.

What is claimed is:

1. A pump diaphragm, comprising:

a first layer formed from a first material which is adapted to be substantially impervious to liquids, the first layer including inner and outer peripheral portions which define inner and outer peripheral edges, respectively;

a second layer disposed in laminar juxtaposition to the first layer and formed from a second material adapted to possess a high level of flexibility and resiliency, the second layer including inner and outer peripheral portions which define inner and outer peripheral edges, respectively, the outer peripheral portion of the second layer being nested within the outer peripheral portion of the first layer, the inner peripheral portion of the second layer being nested within the inner peripheral portion of the first layer; and wherein the pump diaphragm is configured such that at least portions of the first and second layers are moveable relative to each other.

2. The pump diaphragm of claim 1 wherein the first material is adapted to be substantially impervious to hydrophobic liquids.

3. The pump diaphragm of claim 2 wherein the first material is adapted to be substantially impervious to hydrophilic liquids.

4. The pump diaphragm of claim 3 wherein the first material is a synthetic rubber.

5. The pump diaphragm of claim 1 wherein the second material is a thermoplastic elastomer.

6. The pump diaphragm of claim 1 wherein:

the first material is a synthetic rubber adapted to be substantially impervious to hydrophobic and hydrophilic liquids; and the second material is a thermoplastic elastomer.

7. A pump diaphragm for use in a pump having at least first and second housing sections, an interior pumping chamber, and a piston disposed within the pumping chamber, the pump diaphragm comprising:

a first layer including inner and outer peripheral portions which define inner and outer peripheral edges, respectively, the first layer being formed from a first material adapted to be substantially impervious to liquids;

a second layer including inner and outer peripheral portions which define inner and outer peripheral edges, respectively, the second layer being disposed in laminar juxtaposition to the first layer, the second layer being formed from a second material adapted to possess a high level of flexibility and resiliency, the outer peripheral portion of the second layer being nested within the outer peripheral portion of the first layer, the inner peripheral portion of the second layer being nested within the inner peripheral portion of the first layer; and at least portions of the first and second layers being movable relative to each other when the outer peripheral edges thereof are captured between the first and second housing sections and the inner peripheral edges thereof are captured within the piston.

8. The pump diaphragm of claim 7 wherein:

the outer peripheral portions of the first and second layers are sized relative to the first and second housing sections so as to be compressed thereby when captured therebetween, and the inner peripheral portions of the first and second layers are sized relative to the piston so as to be compressed thereby when captured therein.

9. A method of fabricating a pump diaphragm, comprising the steps of:

(a) forming a first layer to have a generally annular configuration from a first material which is adapted to be substantially impervious to liquids, the first layer including an outer peripheral portion which defines an outer peripheral edge and an inner peripheral portion which defines an inner peripheral edge;

(b) forming a second layer to have a generally annular configuration from a second material adapted to possess a high level of flexibility and resiliency, the second layer including an outer peripheral portion which defines an outer peripheral edge and is configured to be nested within the outer peripheral portion of the first layer, and an inner peripheral portion which defines an inner peripheral edge and is configured to be nested within the inner peripheral portion of the first layer; and (c) disposing the second layer into laminar juxtaposition with the first layer such that at least portions of the first and second layers are moveable relative to each other, the outer peripheral portion of the second layer being nested into the outer peripheral portion of the first layer, and the inner peripheral portion of the second layer being nested into the inner peripheral portion of the first layer.

10. The method of claim 9 wherein:

step (a) comprises forming the first layer from a synthetic rubber material which is adapted to be substantially impervious to hydrophobic and hydrophilic liquids; and step (b) comprises forming the second layer from a thermoplastic elastomer.

11. A pump diaphragm, comprising:

a first layer formed from a first material which is adapted to be substantially impervious to liquids, the first layer including inner and outer peripheral portions which define inner and outer peripheral edges, respectively; and a second layer disposed adjacent to the first layer and formed from a second material adapted to possess a high level of flexibility and resiliency, the second layer including inner and outer peripheral portions which define inner and outer peripheral edges, respectively, the outer peripheral portion of the second layer being nested within the outer peripheral portion of the first layer, the inner peripheral portion of the second layer being nested within the inner peripheral portion of the first layer.

12. The pump diaphragm of claim 11 wherein the second layer is disposed in laminar juxtaposition to the first layer.

13. The pump diaphragm of claim 11 wherein the pump diaphragm is configured such that at least portions of the first and second layers are moveable relative to each other.

14. The pump diaphragm of claim 11 wherein:

the first material is a synthetic rubber adapted to be substantially impervious to hydrophobic and hydrophillic liquids; and the second material is a thermoplastic elastomer.

15. A method of fabricating a pump diaphragm, comprising the steps of:

(a) forming a first layer from a first material which is adapted to be substantially impervious to liquids, the first layer including an outer peripheral portion which defines an outer peripheral edge and an inner peripheral portion which defines an inner peripheral edge;

(b) forming a second layer from a second material adapted to possess a high level of flexibility and resiliency, the second layer including an outer peripheral portion which defines an outer peripheral edge and an inner peripheral portion which defines an inner peripheral edge; and (c) disposing the second layer adjacent to the first layer such that the outer peripheral portion of the second layer is nested into the outer peripheral portion of the first layer and the inner peripheral portion of the second layer is nested into the inner peripheral portion of the first layer.

16. The method of claim 15 wherein step (c) comprises disposing the second layer into laminar juxtaposition with the first layer such that at least portions of the first and second layers are moveable relative to each other.

17. The method of claim 15 wherein:

step (a) comprises forming the first layer to have a generally annular configuration; and step (b) comprises forming the second layer to have a generally annular configuration.

18. The method of claim 15 wherein:

step (a) comprises forming the first layer from a synthetic rubber material which is adapted to be substantially impervious to hydrophobic and hydrophillic liquids; and step (b) comprises forming the second layer from a thermoplastic elastomer.

19. A pump diaphragm for use in a pump having a piston and at least first and second housing sections, the pump diaphragm comprising:

a first layer defining inner and outer peripheral edges and formed from a first material adapted to be substantially impervious to liquids;

a second layer defining inner and outer peripheral edges and disposed in laminar juxtaposition to the first layer, the second layer being formed from a second material adapted to possess a high level of flexibility and resiliency; and wherein at least portions of the first and second layers are moveable relative to each other when the outer peripheral edges thereof are compressed, without being affixed to each other, between the first and second housing sections and the inner peripheral edges thereof are compressed within the piston.

20. The pump diaphragm of claim 19 wherein:

the outer peripheral edges of the first and second layers are defined by respective outer peripheral portions thereof;

the inner peripheral edges of the first and second layers are defined by respective inner peripheral portions thereof;

the outer peripheral portion of the second layer is nested within the outer peripheral portions of the first layer; and the inner peripheral portion of the second layer is nested within the inner peripheral portion of the first layer.

* * * * *